United States Patent [19]

LaRou

[11] Patent Number: 4,671,681
[45] Date of Patent: Jun. 9, 1987

[54] GREASE PRESSURE LIMITER AND FLOW CONTROL FOR BEARINGS

[75] Inventor: Albert M. LaRou, Naperville, Ill.

[73] Assignee: Emerson Electric Co., St. Louis, Mo.

[21] Appl. No.: 880,045

[22] Filed: Jun. 30, 1986

[51] Int. Cl.$^4$ ............................................. F16C 33/66
[52] U.S. Cl. ..................................... 384/466; 384/475; 384/906
[58] Field of Search ............... 384/466, 475, 906, 474, 384/399, 498

[56] References Cited

U.S. PATENT DOCUMENTS

| | | | |
|---|---|---|---|
| 1,370,861 | 3/1921 | Vanderbeek | 277/95 X |
| 2,441,294 | 5/1948 | Shafer | 384/475 |
| 2,455,166 | 11/1948 | Firth | 384/906 |
| 3,623,782 | 11/1971 | Nakanishi et al. | 384/906 |
| 4,606,656 | 8/1986 | LaRou | 384/475 |

*Primary Examiner*—Lenard A. Footland
*Attorney, Agent, or Firm*—Aubrey L. Burgess

[57] ABSTRACT

In a bearing with a dimple in a grease passage, the improvement wherein the locking pin is urged toward a grease fitting by a spring washer; when the pressure of the introduced grease is excessively high, the locking pin is forced downwardly against the spring washer and blocks the grease passageway through the outer race.

8 Claims, 7 Drawing Figures

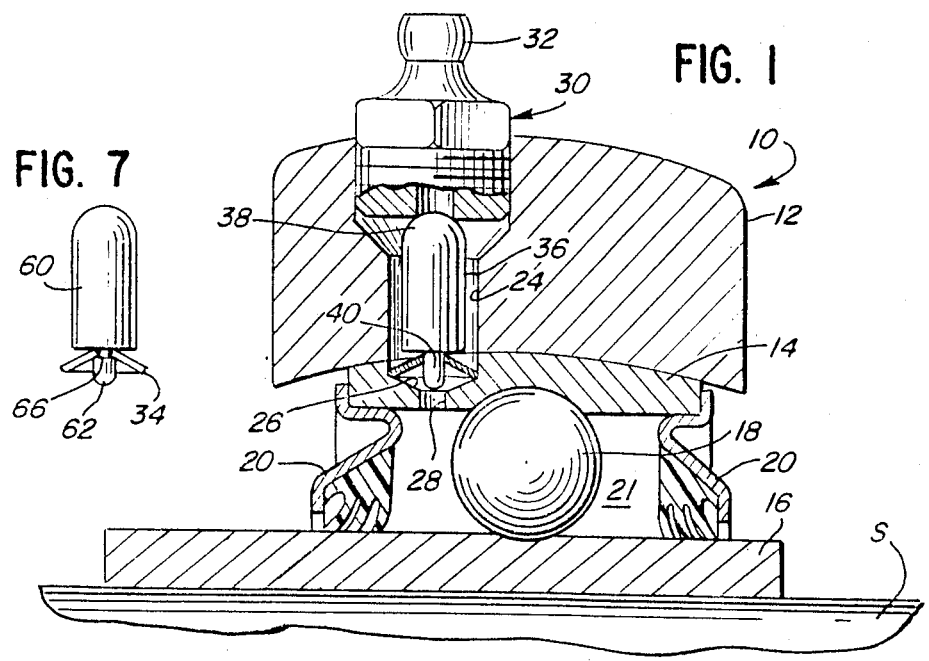
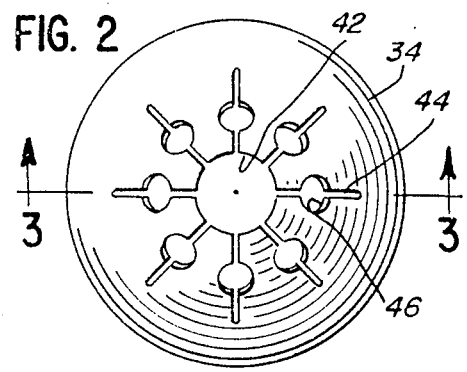
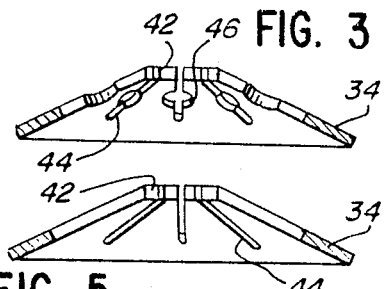
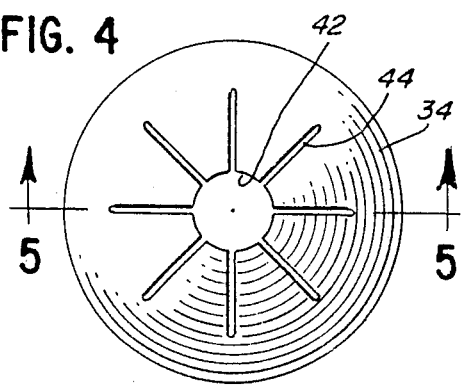
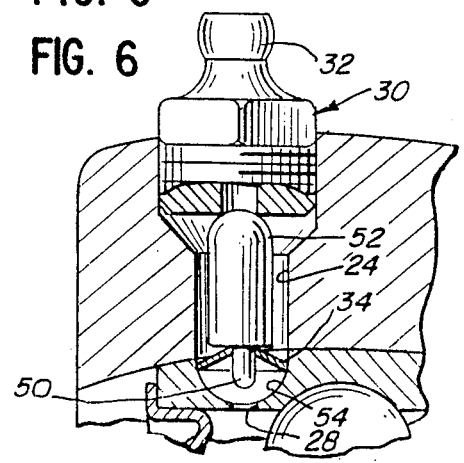

4,671,681

GREASE PRESSURE LIMITER AND FLOW CONTROL FOR BEARINGS

BACKGROUND OF THE INVENTION

1. Field of Invention

This application relates to anti-friction bearings, such as ball or roller bearings, in which a grease fitting is provided to supply grease through grease passages in the housing and outer race to the anti-friction elements. In some of these bearings, a locking pin is placed in the grease passage of the housing and extends into a dimple in the outer race. The locking pin serves to substantially prevent relative rotation between the housing and the outer race, yet accommodates limited misalignment of the bearing insert with respect to the shaft to which the bearing is connected.

2. Discussion of Prior Art

Vanderbeek, U.S. Pat. No. 1,370,861, relates to an oil closure for shaft bearings and teaches the use of a spring pressed flexible closure member for preventing leakage of oil from the bearing.

SUMMARY OF THE INVENTION

According to the present invention, in a bearing having a housing, outer and inner races, anti-friction means between the races, and seals located near the ends of the races and therebetween, a Belleville spring or similar washer is located in the dimple in the outer race thereof, and the locking pin received in the grease fitting is provided with a reduced diameter portion which fits into and through the center of the washer. The diameter of the reduced diameter portion of the locking pin closely matches or exceeds the diameter of the grease passage which joins the dimple and the interior of the outer race. The spring washer urges the locking pin toward the grease fitting which is threadably received in the grease passage in the housing. The upper end of the locking pin, urged toward the grease fitting, engages the fitting and is provided with a spherical surface.

When grease under pressure is introduced through the grease fitting, the locking pin is pushed downwardly against the spring, permitting grease to pass around the pin, and through holes or slits in the spring. In the event the grease pressure is excessive, the locking pin's reduced diameter portion blocks the outer race's grease passage and prevents the entrance of the high pressure grease into the bearing assembly, thus protecting the bearing seals against blow out which would render them useless. Under lower pressure, grease flows around the locking pin into the cavity or space defined by the races and the seals to lubricate the anti-friction means. Some grease may be forced through the seals at the lower pressure which is consistent with a desired purging action.

BRIEF DESCRIPTION OF THE DRAWINGS

FIG. 1 is a partial cross-sectional view through a single row ball bearing constructed according to this invention;

FIG. 2 is a plan view of a typical spring washer used in this invention;

FIG. 3 is a sectional view taken on line 3—3 of FIG. 2;

FIG. 4 is a plan view of a second embodiment of the spring washer for use in this invention;

FIG. 5 is a sectional view taken on line 5—5 of FIG. 4.

FIG. 6 is a partial view of an alternative form of dimple and locking pin, the dimple's defining surface providing a seat for the locking pin; and FIG. 7 is a view of an alternative construction of a locking pin and spring washer assembly.

DETAILED DESCRIPTION OF THE PREFERRED EMBODIMENTS

FIG. 1 of the drawing illustrates a single row ball bearing unit 10, comprising a housing 12, an outer race 14, an inner race 16, and a plurality of spaced balls 18 therebetween. Bearing seals 20, 20 are disposed between the races to define a lubrication cavity 21 therewith. One form of seals uses one or more flexible molded nitrile or other elastomeric lips as shown or elastomeric coated fabric washers, so supported that the inner portions wipe the rotating inner race. The seals 20, 20 serve, not only to contain the lubricant in the cavity 21, but also to substantially prevent the ingress of dirt and other debris into the cavity 21. The inner race 16 is connected to a rotatable shaft S (only partially shown) by means of set screws or forms of locking collars. The connecting means are well known in the art and need no further description.

The bearing unit 10 is provided with a grease passage 24 in the housing 12, which is aligned with a dimple 26 and a passageway 28 in the outer race 14. The dimple substantially matches the passage 24 in diameter, while the passageway 28 is substantially smaller in diameter. A grease fitting 30 with a radially extending nozzle 32 is threadably received in the passage 24 and a spring washer 34 (see FIGS. 2 to 5) having an outer diameter slightly smaller than that of the dimple 26 is received in the dimple. A locking pin 36 having a generally cylindrical body, an upper spherical end 38 and a reduced diameter lower end 40 is received in the passage 24 with the lower end 40 being received in the spring washer 34 and extending toward the passageway 28.

When assemblying the unit, as thus described, the inner and outer races with the anti-friction elements therebetween and the spring washer 34 in the dimple 26, are assembled in the housing 12. The passage 24 is aligned with the dimple 26 (and thus with the passageway 28), and the locking pin 36 is inserted into the passage 24, so that its end 40 is received in the spring washer 34. The grease fitting 30 is screwed into the pillow block, and is tightened down until it touches the top of the locking pin 36. The grease fitting can compress the assembly slightly, if desired. The locking pin functions in the customary manner, substantially preventing rotation of the outer race with respect to the pillow block while permitting restricted alignment of the bearing unit in the pillow block. The various passages aligned by the locking pin assure a direct path for the introduction and replacement of grease into the bearing.

The spring washer 34 can be as illustrated in FIGS. 2 and 3, wih a center opening 42 and a plurality of slots 44 therethrough, or can be formed with a plurality of openings 46 in addition to the center opening 42 as illustrated in FIGS. 4 and 5.

Excessively high grease pressure causes the locking pin to move downwardly, deflecting the spring washer and permitting the end 40 to block passageway 28, thus sealing the passageway from the introduction of grease therethrough.

Lower grease pressure permit the flow of grease into the cavity 41 between the races, and also permits the purging of excess and old grease from the cavity 21 through the seals 20.

Looking now at FIG. 6, there is illustrated another embodiment if the invention wherein the reduced diameter portion 50 of the locking pin 52 has a diameter in excess of the diameter of the passageway 28 in the outer race 14 and the dimple 54 is generally spherical in shape. The operation of this embodiment is generally the same as that described above with reference to FIG. 1. However, the reduced diameter portion 50 of the locking pin 52 seats on the surface which defines the dimple and blocks the passageway 28.

Another form of the locking pin and spring washer is illustrated in FIG. 7. Here the locking pin 60 has a reduced diameter portion 62 which is undercut at 66 at the juncture thereof with the main body of the pin 60, so as to hold captive the spring washer 34. This provides a simpler assembly of the locking pin and spring washer subassembly with the remaining parts of the unit, in that the subassembly of the locking pin and the spring washer can be installed into the passage 24 as a unit to rest on the lower surface of the dimple 26. The operation of this embodiment is essentially the same as described above.

While the invention has been described with reference to a single row ball bearing unit, it is to be understood that the invention is applicable to double row ball bearing units and other types of bearings using different anti-friction means.

The appended claims are intended to cover all reasonable equivalents and are to be interpreted as broadly as the prior art will permit.

I claim:

1. In an anti-friction bearing having a housing, an outer race, an inner race, anti-friction means between the races, a grease passage through the housing with a grease fitting therein, a dimple and a grease passageway through said outer race aligned with said passage, and a locking pin in said passage, said locking pin having an end extending into said dimple, the improvement comprising:
    a spring washer in said dimple urging said locking pin toward said grease fitting, said locking pin having a reduced diameter lower portion passing through said spring washer, said locking pin being urged downwardly against said spring washer when grease under pressure is introduced through said grease fitting.

2. In an anti-friction bearing as recited in claim 1, wherein said locking pin's reduced diameter portion substantially matches the diameter of said passageway and blocks said passageway when the introduced grease pressure is excessively high.

3. In an anti-friction bearing as recited in claim 2, in which said locking pin is provided with a spherical shaped end engaging said grease fitting to permit the passage of grease under pressure therefrom.

4. In an anti-friction bearing as recited in claim 1, wherein said locking pin's reduced diameter portion has a diameter larger than the diameter of said passageway and seats on a surface defining said dimple to block said passageway when the introduced grease pressure is excessively high.

5. In an anti-friction bearing as recited in claim 4, in which said locking pin is provided with a spherical shaped end engaging said grease fitting to permit passage of grease under pressure therefrom.

6. In an anti-friction bearing as recited in claim 1, further comprising openings in said spring washer permitting a limited and controlled quantity of grease to flow therethrough when graese is introduced through said grease fitting.

7. In an anti-friction bearing as recited in claim 1, further comprising seal means between said inner and outer races defining therewith a cavity for retaining grease introduced through said grease fitting.

8. In an anti-friction bearing as recited in claim 1, further comprising means defining an undercut portion on said locking pin's reduced diameter portion, said undercut portion being adapted to hold said spring washer in captive relationship therewith.

* * * * *